US012709672B2

(12) United States Patent
Haroun et al.

(10) Patent No.: US 12,709,672 B2
(45) **Date of Patent: *Aug. 18, 2026**

(54) PROCESS FOR DEPOLYMERIZING A POLYESTER COMPRISING POLYETHYLENE TEREPHTHALATE

(71) Applicant: IFP Energies Nouvelles, Rueil-Malmaison Cedex (FR)

(72) Inventors: Yacine Haroun, Rueil-Malmaison Cedex (FR); Adrien Mekki-Berrada, Rueil-Malmaison Cedex (FR); Olivier Thinon, Rueil-Malmaison Cedex (FR); Cyprien Charra, Rueil-Malmaison Cedex (FR); Damien Leinekugel Le Cocq, Rueil-Malmaison Cedex (FR); Mayara Azim Gondim Paiva, Lyons (FR)

( * ) Notice: Subject to any disclaimer, the term of this patent is extended or adjusted under 35 U.S.C. 154(b) by 806 days.

This patent is subject to a terminal disclaimer.

(21) Appl. No.: 17/786,139

(22) PCT Filed: Dec. 7, 2020

(86) PCT No.: PCT/EP2020/084850

§ 371 (c)(1),
(2) Date: Jun. 16, 2022

(87) PCT Pub. No.: WO2021/122095

PCT Pub. Date: Jun. 24, 2021

(65) Prior Publication Data

US 2023/0357531 A1 Nov. 9, 2023

(30) Foreign Application Priority Data

Dec. 19, 2019 (FR) ...................................... 1914994

(51) Int. Cl.
*C08J 11/24* (2006.01)

(52) U.S. Cl.
CPC ............ *C08J 11/24* (2013.01); *C08J 2367/02* (2013.01)

(58) Field of Classification Search
CPC .. C08J 11/24; C08J 2367/02; B29B 2017/046
See application file for complete search history.

(56) References Cited

U.S. PATENT DOCUMENTS 5,635,584 A 6/1997 Ekart et al.
6,162,837 A * 12/2000 Gerking .................. B29B 7/845 521/48.5

(Continued)

FOREIGN PATENT DOCUMENTS

JP 2004196880 A 7/2004
WO 2018007356 A1 1/2018

OTHER PUBLICATIONS

Dickey, D. S. Mixing and Blending. Kirk-Othmer Encyclopedia of Chemical Technology. John Wiley & Sons, Inc. Apr. 16, 2010. (Year: 2010).*

(Continued)

*Primary Examiner* — Stephen E Rieth
(74) *Attorney, Agent, or Firm* — Csaba Henter; MILLEN, WHITE, ZELANO & BRANIGAN, P.C.

(57) ABSTRACT

A process for depolymerizing a polyester feedstock containing PET by, prior to the step of depolymerization by glycolysis and to the step of purification of the depolymerization effluent, an improved step of conditioning the feedstock in which the polyester feedstock is conditioned in terms of temperature and pressure and then mixed with a diol effluent in a static or dynamic mixer to substantially reduce the viscosity of the feedstock.

18 Claims, 1 Drawing Sheet

(56) References Cited

U.S. PATENT DOCUMENTS

| | | | |
|---|---|---|---|
| 6,630,601 B1 | 10/2003 | Inada et al. | |
| 7,193,104 B2 | 3/2007 | Inada et al. | |
| 10,544,276 B2 | 1/2020 | Charra et al. | |
| 2006/0074136 A1 | 4/2006 | Smith et al. | |
| 2015/0105532 A1 | 4/2015 | Allen et al. | |
| 2019/0161595 A1* | 5/2019 | Charra | C07C 67/54 |

OTHER PUBLICATIONS

Machine Translation of JP2004-196880A. Jul. 15, 2004. (Year: 2004).*

Rauwendaal et al. Polymer Processing: Extrusion. Encyclopedia of Polymer Science and Technology. John Wiley & Sons, Inc. 2017. (Year: 2017).*

International Search Report PCT/EP2020/084850 dated Mar. 29, 2021 (pp. 1-2).

* cited by examiner

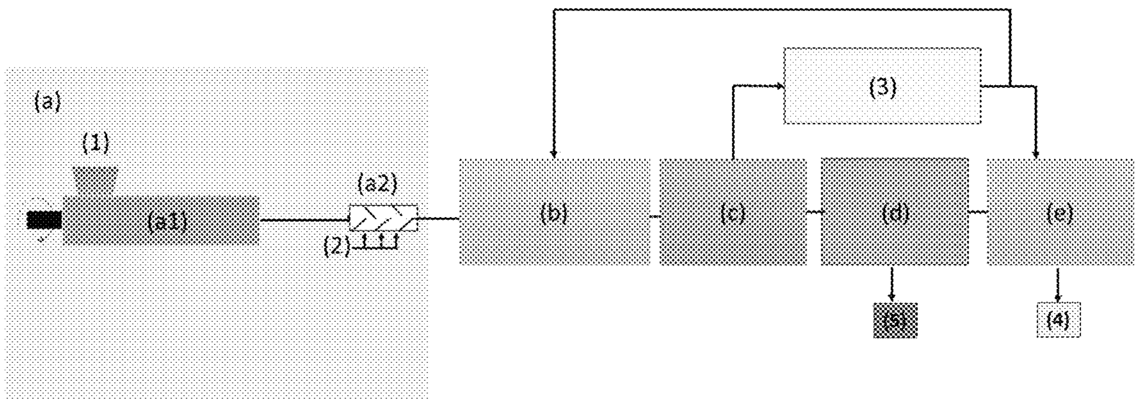
(a)
(1)
(a1)
(a2)
(2)
(b)
(c)
(d)
(e)
(3)
(5)
(4)

PROCESS FOR DEPOLYMERIZING A POLYESTER COMPRISING POLYETHYLENE TEREPHTHALATE

TECHNICAL FIELD

The invention relates to a process for depolymerizing a polyester, in particular terephthalate polyester, comprising polyethylene terephthalate (PET), for the purpose of recycling it in a polymerization unit. More particularly, the invention relates to a process for depolymerizing a polyester feedstock comprising PET, with an improved step of conditioning said feedstock.

PRIOR ART

The chemical recycling of polyester, in particular of polyethylene terephthalate (PET) has been the subject of numerous studies directed towards decomposing the polyester recovered in the form of waste into monomers which can be used again as feedstock in a polymerization process.

Numerous polyesters result from circuits for collecting and sorting materials. In particular, polyester, in particular PET, may originate from the collection of bottles, containers, films, resins and/or fibres composed of polyester (for instance textile fibres, tyre fibres). The polyester resulting from collecting and sorting channels is known as polyester to be recycled. PET for recycling can be classified into four main categories:

- clear PET, predominantly consisting of transparent colourless PET (in general at least 60% by weight) and of transparent blue-coloured PET, which does not contain any pigments and may be used in mechanical recycling processes.
- dark or coloured (green, red, and the like) PET, which may generally contain up to 0.1% by weight of dyes or pigments but remains transparent or translucent;
- opaque PET, which contains a significant amount of pigments in contents typically ranging between 0.25% and 5.0% by weight, to opacify the polymer. Opaque PET is increasingly being used, for example in the manufacture of food containers, such as milk bottles, in the composition of cosmetic, plant-protection or dye bottles;
- multilayer PET, which includes layers of polymers other than PET or a layer of recycled PET between layers of virgin PET (that is to say PET which has not undergone recycling), or a film of aluminium, for example. Multilayer PET is used, after thermoforming, to produce packagings, such as container trays.

The collection channels, which supply the recycling channels, are structured differently from one country to another. They are changing so as to maximize the amount of plastic upgraded from waste as a function of the nature and amount of the supply streams and of the sorting technologies. The channel for recycling these supply streams generally consists of a first step of conditioning in the form of flakes during which bales of raw packaging are washed, purified and sorted, ground and then purified again and sorted to produce a stream of flakes generally containing less than 1% by mass of "macroscopic" impurities (glass, metals, other plastics, wood, paper, cardboard, inorganic elements), preferentially less than 0.2% of "macroscopic" impurities and even more preferentially less than 0.05%.

Clear PET flakes may subsequently undergo an extrusion-filtration step to produce extrudates which can subsequently be reused as a mixture with virgin PET to produce new products (bottles, fibres, films). A step of solid state polymerization under vacuum (known by the abbreviation SSP) is necessary for food uses. This type of recycling is known as mechanical recycling.

Dark (or coloured) PET flakes can also be recycled mechanically. However, the colouration of the extrudates formed from the coloured supply streams limits the uses: dark PET is generally used to produce packaging straps or fibres. The outlets are thus more limited in comparison with those of clear PET.

The presence of opaque PET containing pigments in high contents, in PET for recycling, presents problems to recyclers as opaque PET adversely affects the mechanical properties of recycled PET. Opaque PET is currently collected with coloured PET and is found in the coloured PET supply stream. In view of the development of the uses for opaque PET, the contents of opaque PET in the supply stream of coloured PET for recycling are currently between 5-20% by weight and are tending to increase further. In a few years' time, it will be possible to achieve contents of opaque PET in the coloured PET supply stream of greater than 20-30% by weight. However, it has been shown that above 10-15% of opaque PET in the coloured PET supply streams, the mechanical properties of the recycled PET are adversely affected (cf. Impact du développement du PET opaque blanc sur le recyclage des emballages en PET [Impact of the growth of white opaque PET on the recycling of PET packagings], preliminary report of COTREP of 5/12/13) and prevent recycling in the form of fibres, the main outlet of the coloured PET channel.

Dyes are natural or synthetic substances which are soluble, in particular in the polyester material, and are used to colour the material into which they are introduced. The dyes generally used are of varied nature and often contain heteroatoms of 0 and N type, and conjugated unsaturations, for instance quinone, methine or azo functions, or molecules such as pyrazolone and quinophthalone. Pigments are finely divided substances which are insoluble, in particular in the polyester material, and which are used to colour and/or opacify the material into which they are introduced. The main pigments used for colouring and/or opacifying polyesters, in particular PET, are metal oxides, such as $TiO_2$, $CoAl_2O_4$ or $Fe_2O_3$, silicates, polysulfides and carbon black. The pigments are particles with a size generally of between 0.1 and 10 μm and predominantly between 0.4 and 0.8 μm. The complete removal of these pigments by filtration, which is necessary in order to envisage recycling the opaque PET, is technically difficult as they have an extremely high clogging capability.

The recycling of coloured and opaque PETs is thus extremely problematic.

Patent application US 2006/0074136 describes a process for the depolymerization by glycolysis of coloured PET, in particular resulting from the recovery of green-coloured PET bottles. The feedstock treated by means of this process is in the form of PET flakes and is placed in contact with ethylene glycol in a reactor at a temperature between 180 and 280° C. for several hours. The BHET obtained on conclusion of the glycolysis step is purified over active charcoal to separate out certain dyes, such as blue dyes, followed by extraction of the residual dyes, such as the yellow dyes, with an alcohol or with water. The BHET, which crystallizes in the extraction solvent, is then separated out, for the purpose of being able to be used in a PET polymerization process.

In patent application US 2015/0105532, post-consumption PET comprising a mixture of various coloured PETs, such as clear PET, blue PET, green PET and/or amber PET, in the form of flakes, is depolymerized by glycolysis in the presence of ethylene glycol and of an amine catalyst and alcohol, in a reactor at 150-250° C., in batch mode. The diester monomer then obtained is purified by filtration, ion exchange and/or passage over active charcoal, before being crystallized and recovered by filtration.

In patent EP0865464, the process for depolymerizing polyester, in particular coloured polyester, for example green PET, comprises the steps of depolymerization in the presence of a diol in a reactor at a temperature of between 180 and 240° C., of optional evaporation in a thin-film evaporator, without, however, specifying the conditions under which this evaporator should be operated, and of dissolution of the mixture in a hot solvent. Hot dilution is followed by a filtration step for separating out the insoluble impurities greater than 50 am in size. The low proportion of pigments in coloured PET enables separation by filtration. However, this technology cannot operate with the amount of pigments present in opaque PET, since these pigments rapidly block the filter.

Patent JP3715812 describes the production of refined BHET from PET in flake form. The depolymerization step consists of glycolysis of the PET flakes which have been pretreated by washing with water in solid form, in the presence of ethylene glycol and of a catalyst in a stirred reactor at 180° C. to remove the residual water and then at 195-200° C. The depolymerization is followed by a step of pre-purification by cooling, filtration, adsorption and treatment on an ion-exchange resin, presented as being very important, performed before evaporation of the glycol and purification of the BHET. The pre-purification makes it possible to prevent the re-polymerization of the BHET in the subsequent purification steps. However, preceding via a step of filtration and ion-exchange resin may be extremely problematic when the feedstock comprises a large amount of very small solid particles, such as pigments, and/or polymer compounds other than PET, for instance polyolefins or polyamides, which is the case when the treated feedstock comprises opaque PET and/or multilayer preformed PET, in particular in substantial proportions (more than 10% by weight of opaque PET and/or of multilayer preformed PET).

In parallel, patent EP 1 120 394 discloses a process for depolymerizing a polyester comprising a step of glycolysis in the presence of ethylene glycol and a process for purifying a solution of bis(2-hydroxyethyl) terephthalate on a cation-exchange resin and an anion-exchange resin.

Finally, patent application FR 3053691 describes a process for depolymerizing a polyester feedstock comprising opaque PET and in particular from 0.1% to 10% by weight of pigments, by glycolysis in the presence of ethylene glycol. A purified bis(2-hydroxyethyl) terephthalate (BHET) effluent is obtained after particular separation and purification steps. Said patent application envisages the possibility of reactive extrusion in a first step of conditioning of the feedstock to initiate the depolymerization reaction.

The present invention seeks to improve these processes for the depolymerization by glycolysis of a polyester feedstock comprising PET and in particular that of patent application FR 3053691, in particular in order to improve the phase of conditioning the polyester feedstock and its mixing with at least one diol effluent, upstream of its introduction into the depolymerization step.

SUMMARY OF THE INVENTION

The subject matter of the invention is thus a process for depolymerizing a polyester feedstock comprising PET, said process comprising:

a) a conditioning step implementing at least one conditioning section to produce a stream of conditioned feedstock, and a mixing section to produce a mixed stream, wherein said conditioning section is fed at least with said polyester feedstock and is implemented at a temperature of between 150 and 300° C., wherein said mixing section is at least fed with said stream of conditioned feedstock obtained from the conditioning section and a diol effluent, and is operated in a static or dynamic mixer, at a temperature of between 150 and 300° C., with a residence time of between 0.5 second and 20 minutes, and such that the weight ratio of diol relative to the polyester feedstock is between 0.03 and 3.0;

b) a step of depolymerization by glycolysis, fed at least with the mixed stream and optionally with a diol supply so that the total amount of diol feeding said step b) is adjusted to 1 to 20 mol of diol per mole of diester feeding said step b), performed at a temperature of between 180 and 400° C., and a residence time of between 0.1 and 10 hours;

c) a step of separating out the diol fed at least with the effluent from step b), performed at a temperature of between 100 and 250° C., at a pressure below that of step b) and producing a diol effluent and an effluent rich in liquid monomers, wherein said diol separation step is performed in 1 to 5 successive gas-liquid separation sections, the liquid effluent from the preceding section feeding the next section, and producing a diol effluent and an effluent rich in liquid monomers;

d) a step of separating the effluent rich in liquid monomers obtained from step c) into a heavy impurities effluent and a pre-purified monomers effluent, performed at a temperature of less than or equal to 250° C. and a pressure of less than or equal to 0.001 MPa with a liquid residence time of less than or equal to 10 minutes, and e) a step of decolourizing the pre-purified monomers effluent, performed at a temperature of between 100 and 250° C., and at a pressure of between 0.1 and 1.0 MPa in the presence of an adsorbent and producing a purified monomers effluent.

One advantage of the invention is that it improves the step of conditioning the polyester feedstock, so as to facilitate the homogenization of the mixture of the polyester feedstock with at least one diol effluent, in the reaction section and to obtain an effective viscosity in the reaction section, and in particular in the reactor directly connected to the conditioning unit, which makes it possible to use a reasonable stirring power, in particular less than 3000 W/m3, in this reactor. The process thus makes it possible to improve the homogenization of the mixture of the feedstock with at least one diol effluent in the reaction section, which makes it possible to improve the depolymerization efficiency, while at the same time reducing the stirring power required for this homogenization in the reaction section.

To ensure good mixing and homogenization of the reagents in the depolymerization reactor(s), it is necessary to provide optimum stirring and in particular a ratio of the residence time to the mixing time (t*=ts/tm) that is as high as possible, preferentially with t* greater than 10 (t*>10). The mixing time depends on several parameters, such as the type of stirring head, the viscosity of the mixture and the stirring power. For short residence times, it is often necessary to provide a high stirring power to meet the criterion t*>10. The present invention affords flexibility to the process and ensures that the criterion t*>10 is satisfied, by allowing a significant reduction in the viscosity of the feedstock upstream of the depolymerization reactor(s) and by achieving up to 95% of the mixing (or even more) between the products, i.e. by achieving virtually total homogenization of the compounds upstream of the reactor.

The stirring of the reaction medium is then dedicated to maintaining the homogeneity in the reactor rather than to dispersing and mixing one product in the other. The invention thus also makes it possible to use a reasonable stirring power (P) in the depolymerization reactor(s), preferably less than 3000 $W/m^3$ ($P<3000\ W/m^3$), which is considered as acceptable by a person skilled in the art, and in particular a stirring power of between 500 and 2000 $W/m^3$.

The present invention also makes it possible to simplify the introduction of the feedstock into the depolymerization reactor. When the feedstock is very viscous, as is the case with molten PET (500-1000 Pa·s), its introduction into the reactor requires certain precautions, in particular with the installation of suitable systems, such as a deflocculator or a dedicated dispersive stirring head. The invention makes it possible to simplify the introduction system by means of improved homogenization of the products and reduction of the viscosity in the conditioning step.

Finally, one advantage of the invention is that it is able to treat any type of polyester waste, which comprises more and more pigments, dyes and other polymers, such as blue, coloured, opaque and multilayer PETs. The process according to the invention, which is capable of treating opaque PET, makes it possible to remove the pigments, dyes and other polymers and to return to the diester monomer by chemical reaction. This monomer can then be repolymerized to a polymer which shows no difference with a virgin polyester, in particular a virgin PET, thus permitting all the uses of virgin PET.

LIST OF FIGURES

FIG. 1

FIG. 1 shows one embodiment of the process according to the invention involving a step (a) of conditioning the feedstock (1) comprising PET and involving an extruder (a1) for conditioning the feedstock (1) followed by a static mixer (a2) also fed with ethylene glycol (2); a depolymerization step (b) fed with the mixture obtained from the conditioning step and with the diol effluent (3); a diol separation step (c) for recovering the diol effluent (3); a step (d) for separating out the BHET diester, to remove the heavy impurities (5); and a step (e) of decolourizing by adsorption to recover a purified BHET effluent (4).

DESCRIPTION OF THE EMBODIMENTS

According to the invention, polyethylene terephthalate or poly(ethylene terephthalate), also known simply as PET has an elemental repeating unit of formula:

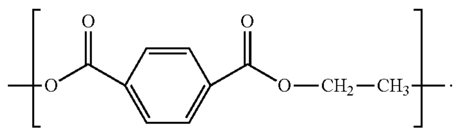

Conventionally, PET is obtained by polycondensation of terephthalic acid (PTA) or dimethyl terephthalate (DMT) with ethylene glycol. In the text hereinbelow, the expression "per mole of diester in said polyester feedstock" corresponds to the number of moles of $-[O-CO-O-(C_6H_4)-CO-O-CH_2-CH_2]-$ unit, which is the diester unit obtained from the reaction of PTA and of ethylene glycol, in the PET included in said polyester feedstock.

According to the invention, the term "monomer" or "diester monomer" advantageously denotes bis(2-hydroxyethyl) terephthalate (BHET) of chemical formula $HOC_2H_4-CO_2-(C_6H_4)-CO_2-C_2H_4OH$, in which $-(C_6H_4)-$ represents an aromatic ring, and which is the diester unit obtained from the reaction of PTA and of ethylene glycol, in the PET included in said polyester feedstock.

The term "oligomer" typically denotes a small-sized polymer, generally consisting of 2 to 20 elementary repeating units. According to the invention, the term "ester oligomer" or "BHET oligomer" denotes a terephthalate ester oligomer, comprising between 2 and 20, preferably between 2 and 5, elementary repeating units of formula $-[O-CO-(C_6H_4)-CO-O-C_2H_4]-$, with $-(C_6H_4)-$ being an aromatic ring.

According to the invention, the terms "diol" and "glycol" are used equivalently and correspond to compounds comprising two hydroxyl groups —OH. The preferred diol is ethylene glycol, also known as monoethylene glycol or MEG.

The diol or diol effluent streams used in the steps of the process of the invention, thus preferably comprise ethylene glycol (or MEG) in very predominant amounts, i.e. such that the MEG represents 95% by weight or more relative to the total weight of said diol or diol effluent stream.

The term "dye" defines a substance that is soluble in the polyester material and that is used to colour it. The dye may be of natural or synthetic origin.

According to the invention, the term "pigment", more particularly a colouring and/or opacifying pigment, defines a finely divided substance, which is in particular insoluble in the polyester material. The pigments are in the form of solid particles, with a size generally between 0.1 and 10 μm and predominantly between 0.4 and 0.8 μm. They are often of mineral nature. The pigments generally used, in particular for opacifying, are metal oxides, such as $TiO_2$, $CoAl_2O_4$ or $Fe_2O_3$, silicates, polysulfides and carbon black.

According to the present invention, the expression "between . . . and . . . " means that the limit values of the interval are included in the described range of values. If such were not the case and if the limiting values were not included in the range described, such a clarification will be given by the present invention.

In the text hereinbelow, particular and/or preferred embodiments of the invention may be described. They may be implemented separately or combined together without limitation of combination when this is technically feasible.

Feedstock

The process according to the invention is fed by a polyester feedstock comprising at least one polyester, i.e. a polymer in which the repeating unit of the main chain contains an ester function, and comprising polyethylene terephthalate (PET), preferably comprising at least coloured PET and/or opaque PET.

Said polyester feedstock is advantageously a feedstock of polyester for recycling, obtained from waste collection and sorting channels, in particular plastic waste. Said polyester feedstock may come, for example, from the collection of bottles, container trays, films, resins and/or fibres consisting of polyethylene terephthalate.

Advantageously, the polyester feedstock comprises at least 50% by weight, preferably at least 70% by weight and in a preferred manner at least 90% by weight of polyethylene terephthalate (PET).

Preferably, said polyester feedstock comprises at least one PET chosen from coloured, opaque, dark and multilayer PET, and mixtures thereof. Said polyester feedstock very particularly comprises at least 10% by weight of opaque PET, very preferably at least 15% by weight of opaque PET, said opaque PET advantageously being opaque PET for recycling, i.e. obtained from collection and sorting channels.

Said polyester feedstock advantageously comprises from 0.1% to 10% by weight of pigments, advantageously from 0.1% to 5% by weight. In particular it may also comprise from 0.05% to 1% of dyes, preferably from 0.05% to 0.2% by weight.

In collection and sorting channels, polyester waste is washed and ground before constituting the polyester feedstock of the process according to the invention.

The polyester feedstock may be totally or partly in the form of flakes, the longest length of which is less than 10 cm, preferentially between 5 and 25 mm, or in micronized solid form, i.e. in the form of particles preferably between 10 microns and 1 mm in size. The feedstock may also comprise macroscopic impurities, preferably less than 5% by weight, preferentially less than 3% by weight of macroscopic impurities, such as glass, metal, plastics other than polyester (for example PP, PEHD, etc.), wood, paper, cardboard or inorganic elements. Said polyester feedstock may also be totally or partly in the form of fibres, such as textile fibres, which have optionally been pretreated to remove cotton or polyamide fibres, or any textile fibre other than polyester, or such as tyre fibres, which have optionally been pretreated in particular to remove polyamide fibres or rubber or polybutadiene residues. Said polyester feedstock may also comprise polyester obtained from production rejects of polyester polymerization and/or transformation processes. The polyester feedstock may also comprise elements used as polymerization catalyst and as stabilizers in PET production processes, such as antimony, titanium or tin.

Conditioning Step a)

Said process according to the invention comprises a conditioning step a) involving at least, preferably solely, a conditioning section and a mixing section, wherein said conditioning section is fed with said polyester feedstock and producing a stream of conditioned feedstock, wherein said mixing section is fed at least with said stream of conditioned feedstock and a diol effluent and produces a mixed stream.

Said conditioning section of step a) makes it possible to heat and to keep under pressure said polyester feedstock at the operating conditions of the depolymerization step b). In the conditioning section, the polyester feedstock is gradually heated to a temperature close to or even slightly above its melting point so as to become at least partly liquid. Advantageously, at least 70% by weight of the polyester feedstock, very advantageously at least 80% by weight, preferably at least 90% by weight, preferentially at least 95% by weight of the polyester feedstock is in liquid form on leaving the conditioning section of step a). The temperature at which the conditioning section of step a) is run is advantageously between 150 and 300° C., preferably between 225 and 275° C. This temperature is kept as low as possible to minimize the thermal degradation of the polyester. Preferably, the conditioning section is operated under an inert atmosphere to limit the introduction of oxygen into the system and the oxidation of the polyester feedstock.

According to a preferred embodiment of the invention, said conditioning section is an extrusion section which corresponds to a screw conveying section. In other words, the conditioning section is operated in an extruder. The residence time in said extrusion section, defined as being the volume of said section divided by the volume flow rate of feedstock, is advantageously less than or equal to 5 hours, preferably less than or equal to 1 hour, preferentially less than or equal to 30 minutes, preferably less than or equal to 10 minutes, and preferably greater than or equal to 2 minutes. Advantageously, the extrusion section makes it possible to condition the polyester feedstock such that the stream of conditioned feedstock is at a temperature of between 150 and 300° C., preferably between 225 and 275° C., and at a pressure between atmospheric pressure (i.e. 0.1 MPa) and 20 MPa.

Said extrusion section is advantageously connected to a vacuum extraction system so as to remove impurities, such as dissolved gases, light organic compounds and/or moisture present in the feedstock. Said extrusion section may also advantageously comprise a filtration system to remove solid particles greater than 40 μm in size and preferably less than 2 cm, such as sand particles. The polyester feedstock is advantageously fed into the extruder by any method known to those skilled in the art, for example via a feed hopper, and is advantageously inertized to limit the introduction of oxygen into the system.

The mixing section is at least, preferably solely, fed with said stream of conditioned feedstock obtained from the conditioning section and a diol effluent, preferably with a fraction of the diol effluent obtained from step c). In said mixing section, said polyester feedstock, conditioned beforehand in the conditioning section, is advantageously placed in contact with a diol effluent. The effect of this placing in contact is to initiate the depolymerization reaction of the polyester feedstock, before introduction into the depolymerization step b). It also makes it possible to substantially reduce the viscosity of the feedstock, which facilitates its transportation, in particular into the depolymerization step b). Advantageously, the mixing section comprises a static or dynamic mixer, preferably a static mixer. Said mixing section is advantageously run in a static mixer, at a temperature of between 150 and 300° C., preferably between 225 and 275° C., at a residence time, defined as being the ratio between the volume of liquid in the static mixer relative to the volume flow rate of diester feedstock, of between 0.5 second and 20 minutes, preferably 1 second and 5 minutes, preferably between 3 seconds and 1 minute, and such that the weight ratio of the diol weight relative to the weight of the polyester feedstock is between 0.03 and 3.0, preferably between 0.05 and 2.0, preferably between 0.1 and 1.0. This weight ratio of diol relative to the polyester feedstock corresponds to a mole ratio of diol moles relative to the diester moles in the polyester feedstock respectively of between 0.09 and 9.0, preferably between 0.15 and 6.0, in a preferred manner between 0.3 and 3.0.

Preferably, the diol effluent, preferably the fraction of the diol effluent obtained from step c), introduced into the mixing section of step a), is advantageously superheated prior to being introduced into the mixing section of step a) so as to facilitate the establishment of the temperature of the polyester feedstock.

When the conditioning section is operated in an extruder, the mixing section may be implemented in the extruder. In this case, it is a reactive extrusion phase, operated at a temperature of between 150 and 300° C., preferably between 225 and 275° C., at a residence time, defined as being the ratio between the volume of liquid in said mixing section relative to the volume flow rate of diester feedstock of between 0.5 second and one hour, preferably between 0.5 second and 30 minutes, preferably 1 second and 20 minutes, or between 3 seconds and 10 minutes or else 1 minute and 5 minutes, and such that the weight ratio of the diol weight relative to the weight of the polyester feedstock is between 0.03 and 3.0, preferably between 0.33 and 2.0, preferably between 0.35 and 1.0. This weight ratio of diol relative to the polyester feedstock corresponds to a mole ratio of diol moles relative to the diester moles in the polyester feedstock respectively of between 0.09 and 9.0, preferably between 1.0 and 6.0, preferentially between 1.05 and 3.0.

Optionally, at least a fraction of the heavy impurities effluent obtained on conclusion of step d) can also optionally be recycled into the conditioning step a), in particular into the mixing section, or directly into the reaction section of step b), said fraction of the heavy impurities effluent optionally being filtered prior to it being recycled.

Depolymerization Step b)

The process according to the invention comprises a step of depolymerization by glycolysis fed at least with a mixed stream obtained from the conditioning step a), and optionally with a supply of diol, performed such that the total amount of diol feeding said step b), corresponding to the sum of the amounts of diol introduced into step a) and optionally into step b), is adjusted from 1 to 20 mol, preferably from 3 to 15 mol, preferably from 5 to 10 mol of diol per mole of diester feeding said step b), i.e. contained in said mixed stream obtained from step a), i.e. performed such that the weight ratio between the total amount of diol introduced into step a) and optionally into step b) relative to the total amount of diester contained in the mixed stream is, respectively, between about 0.3 and 6.7, preferably between about 1.0 and 5.0, preferably between 1.7 and 3.3.

Advantageously, said depolymerization step b) involves one or more reaction sections, preferably at least two reaction sections, preferably between 2 and 4 reaction sections, preferably functioning in series. Each reaction section may be used in any type of reactor known to a person skilled in the art which makes it possible to perform a depolymerization or transesterification reaction, preferably in a reactor stirred with a mechanical stirring system and/or with a recirculation loop and/or by fluidization. Said reactor may comprise a conical bottom for purging the impurities. Preferably, said depolymerization step b) comprises at least two reaction sections, preferably between 2 and 4 reaction sections, functioning in series, the reaction section(s) from the second reaction section onwards being operated at an identical or different temperature between them and below or equal to the temperature of the first reaction section, preferably below, and preferentially from 10 to 50° C. below, or even from 20 to 40° C. below, relative to the temperature of the first operational section.

Said reaction section(s) are operated at a temperature of between 180 and 400° C., preferably between 200 and 300° C., preferably between 210° C. and 280° C., in particular in the liquid phase, with a residence time in a reaction section of between 0.1 and 10 hours, preferably between 0.25 and 8 hours, between 0.5 and 6 hours. The residence time is defined as being the ratio of the volume of liquid of said reaction section to the volume flow rate of the stream leaving said reaction section.

The operating pressure of said reaction section(s) of step b) is determined so as to keep the reaction system in the liquid phase. This pressure is advantageously at least 0.1 MPa, preferentially at least 0.4 MPa, and preferably less than 5 MPa. The term "reaction system" means all of the constituents and phases present in said step b) obtained from the feeding of said step.

The diol is advantageously monoethylene glycol.

The glycolysis reaction may be performed in the presence or absence of a catalyst.

When the glycolysis reaction is performed in the presence of a catalyst, said catalyst may be homogeneous or heterogeneous and chosen from the esterification catalysts known to a person skilled in the art, such as complexes, oxides and salts of antimony, tin or titanium, alkoxides of metals from groups (1) and (IV) of the Periodic Table of the Elements, organic peroxides or acidic/basic metal oxides.

A preferred heterogeneous catalyst advantageously comprises at least 50% by mass relative to the total mass of the catalyst, preferentially at least 70% by mass, advantageously at least 80% by mass, very advantageously at least 90% by mass and even more advantageously at least 95% by mass of a solid solution consisting of at least one spinel of formula $Z_xAl_2O_{(3+x)}$ in which x is between 0 (limit excluded) and 1, and Z is chosen from Co, Fe, Mg, Mn, Ti and Zn and comprising no more than 50% by mass of alumina and of oxide of the element Z. Said preferred heterogeneous catalyst advantageously contains no more than 10% by mass of dopants chosen from silicon, phosphorus and boron, taken alone or as a mixture. For example, and in a non-limiting manner, said solid solution may consist of a mixture of spinel $ZnAl_2O_4$ and of spinel $CoAl_2O_4$, or else may consist of a mixture of spinel $ZnAl_2O_4$, of spinel $MgAl_2O_4$ and of spinel $FeAl_2O_4$, or else may consist solely of spinel $ZnAl_2O_4$.

Preferably, said depolymerization step is performed without adding external catalyst to the polyester feedstock.

Said depolymerization step may advantageously be performed in the presence of a solid adsorbent which is in powder form or which is formed, the function of which is to take up at least a portion of the coloured impurities, thus relieving the decolourizing step e). Said solid adsorbing agent is advantageously an active charcoal.

The glycolysis reaction makes it possible to convert the polyester feedstock into monomers and oligomers of esters, advantageously PET into at least the monomer bis(2-hydroxyethyl) terephthalate (BHET) and BHET oligomers. The conversion of the polyester feedstock in said depolymerization step is greater than 50%, preferably greater than 70%, in a preferred manner greater than 85%. The molar BHET yield is greater than 50%, preferably greater than 70%, in a preferred manner greater than 85%. The molar BHET yield corresponds to the molar flow rate of BHET at the outlet of said step b) to the number of moles of diester in the polyester feedstock feeding said step b).

An internal recirculation loop is advantageously used in step b), i.e. the withdrawal of a fraction of the reaction system, the filtration of this fraction and the reinjection of said fraction into said step b). This internal loop makes it possible to remove the macroscopic solid impurities that may be present in the reaction liquid.

Advantageously, the depolymerization step b) makes it possible to obtain a reaction effluent which is sent into a diol separation step c).

Step c) of Separation of the Diol

The process according to the invention comprises a diol separation step c), fed at least with the effluent from step b), performed at a temperature of between 100 and 250° C., at a pressure below that of step b) and producing a diol effluent and an effluent rich in liquid monomers.

The main role of step c) is to recover all or part of the unreacted diol.

Step c) is performed at a lower pressure than that of step b) so as to vaporize a fraction of the effluent from step b) to give a gas effluent and a liquid effluent. Said liquid effluent constitutes the effluent rich in liquid monomers. The gas effluent, consisting of more than 50% by weight of diol, preferably more than 70% by weight, preferably more than 90% by weight, constitutes a diol effluent.

Step c) is advantageously performed in a gas-liquid separation section or a succession of gas-liquid separation sections, advantageously from 1 to 5 successive gas-liquid separation sections, very advantageously from 3 to 5 successive gas-liquid separation sections. Each of the gas-liquid separation sections produces a liquid effluent and a gas phase. The liquid effluent from the preceding section feeds the next section. The gas effluents are all recovered to constitute the diol effluent. The liquid effluent obtained from the final gas/liquid separation section constitutes the effluent rich in liquid monomers.

Advantageously, at least one of the gas-liquid separation sections may be implemented in a falling-film evaporator or a thin-film evaporator or short-path distillation apparatus.

Step c) is performed such that the temperature of the liquid effluents is kept above the value below which the polyester monomer precipitates and below a high value, depending on the diol/monomer mole ratio, above which the monomer significantly repolymerizes. The temperature in step c) is between 100 and 250° C., preferably between 110 and 220° C., preferably between 120 and 210° C. Operation as a succession of gas-liquid separations, advantageously as a succession of 2 to 5, preferentially from 3 to 5 successive separations, is particularly advantageous since it makes it possible to adjust in each separation the temperature of the liquid effluent corresponding to the abovementioned constraints.

The pressure in step c) is below that in step b) and is advantageously adjusted to allow evaporation of the diol at a temperature while at the same time minimizing the re-polymerization and enabling optimum energy integration. It is preferably between 0.00001 and 0.2 MPa, preferentially between 0.00004 and 0.15 MPa, preferably between 0.00004 and 0.1 MPa.

The separation section(s) are advantageously stirred via any method known to a person skilled in the art.

The diol effluent may contain other compounds, such as dyes, light alcohols, water or diethylene glycol. At least one fraction of the diol effluent may advantageously be recycled, in liquid form (i.e. after condensation), into step a) and/or step b) and optionally into step e), optionally as a mixture with a supply of diol external to the process according to the invention.

All or part of said diol effluent may be treated in a purification step prior to being recycled, in liquid form, into steps a) and/or b) and/or prior to being used as a mixture in step e). This purification step may comprise, in a non-exhaustive manner, absorption onto solid (for example onto active charcoal), in order to remove the dyes, and one or more distillations, in order to separate out the impurities, such as diethylene glycol, water and other alcohols.

Monomer Separation Step d)

The process according to the invention comprises a step d) of separating out the monomer-rich effluent obtained from step c) producing a heavy impurities effluent and a pre-purified monomers effluent.

Said step d) is advantageously performed at a temperature of less than or equal to 250° C., preferably less than or equal to 230° C., and very preferably less than or equal to 200° C., and preferably greater than or equal to 110° C., and a pressure of less than or equal to 0.001 MPa, preferably less than or equal to 0.0005 MPa, preferably less than or equal to 0.000001 MPa, with a liquid residence time of less than or equal to 10 minutes, preferably less than or equal to 5 minutes, preferably less than or equal to 1 minute, and preferably greater than or equal to 0.1 second.

The object of this separation step d) is to separate the monomer, in particular the BHET, which is vaporized, from the oligomers, which are not entirely converted, which remain liquid and thus also take up the heavy impurities, in particular the pigments, from the unconverted polyester polymer, from other polymers that may be present and from the polymerization catalysts, while at the same time minimizing the loss of monomers by re-polymerization. A few oligomers may possibly be entrained with the monomer, in particular those of small size. These heavy impurities are found with the oligomers in the heavy impurities effluent.

Due to the possible presence of polymerization catalysts in the polyester feedstock, the separation must be performed with very short liquid residence times and at a temperature not exceeding 250° C., so as to limit any risk of re-polymerization of the monomer during this step. A separation by simple atmospheric distillation thus cannot be envisaged.

The separation step d) is advantageously performed in a falling-film or thin-film evaporation system or by short-path falling film or thin-film distillation. A very low operating pressure is necessary in order to be able to perform step d) at a temperature below 250° C., preferably below 230° C., while at the same time permitting vaporization of the monomer.

A polymerization inhibitor may advantageously be mixed with the liquid monomer-rich effluent before feeding said step d).

A flux may also be advantageously mixed with the liquid monomer-rich effluent before feeding said step d), so as to facilitate the removal of the heavy impurities, in particular the pigments, at the bottom of the short-path distillation or evaporation system. This flux may have a boiling point very much higher than that of the monomer, in particular of the BHET, under the operating conditions of step d). It may be, for example, polyethylene glycol, or PET oligomers.

Said heavy impurities effluent in particular comprises pigments, oligomers and possibly BHET which has not been separated out. Said heavy impurities effluent may advantageously undergo at least one separation step, for example by filtration, prior to optionally being recycled, so as to reduce the amount of pigments and/or other solid impurities. The portion of said heavy impurities effluent separated out and having a high solid content may advantageously be purged from the process and sent into an incineration system.

Said pre-purified monomer effluent is advantageously sent into a gas-liquid separation section, implemented in any equipment known to those skilled in the art, at a temperature of between 100 and 250° C., preferably between 110 and 200° C., and preferably between 120 and 180° C., and at a pressure of between 0.00001 and 0.1 MPa, preferably between 0.00001 and 0.01 MPa, and preferably between 0.00001 and 0.001 MPa. Said separation section makes it possible to separate a gaseous diol effluent and a pre-purified liquid monomer effluent. Said gas-liquid separation makes it possible to further reduce the amount of diol remaining in the pre-purified monomer effluent by recovering, in said gaseous diol effluent, more than 50% by weight, preferably more than 70% by weight and in a preferred manner more than 90% by weight of the diol entrained in step d) with the pre-purified monomer effluent. The amount of monomer entrained in said gaseous diol effluent is preferably less than 1% by weight, preferably less than 0.1% by weight and more preferably less than 0.01% by weight of the amount of monomer present in the pre-purified monomer effluent. Said gaseous diol effluent is then advantageously condensed, optionally pretreated in a purification step and recycled with the diol effluent obtained from step c) into step a) and/or step b) and/or as a mixture into step e).

Decolourization Step e)

The process according to the invention comprises a step of decolourizing the pre-purified monomer effluent, performed at a temperature of between 100 and 250° C., preferably between 110 and 200° C., and preferably between 120 and 180° C., and at a pressure of between 0.1 and 1.0 MPa, preferably between 0.2 and 0.8 MPa and preferably between 0.3 and 0.5 MPa in the presence of an adsorbent and producing a purified monomers effluent. Said adsorbent may be any adsorbent known to those skilled in the art which is capable of taking up dyes, such as active charcoal or clays, advantageously an active charcoal.

The pre-purified monomers effluent is advantageously mixed with a fraction of the diol effluent obtained from step c) which has optionally been pretreated in a purification step or with a supply of diol external to the process according to the invention.

The purified monomer effluent advantageously feeds a polymerization step known to those skilled in the art for the purpose of producing PET which cannot in any way be distinguished from virgin PET, advantageously downstream of the feeding with ethylene glycol, with terephthalic acid or with dimethyl terephthalate following the selected polymerization step. The feeding of the purified monomer effluent in a polymerization step makes it possible to reduce, by an equivalent flow rate, the feeding with dimethyl terephthalate or with terephthalic acid.

The figures and examples that follow illustrate the invention without limiting the scope thereof.

EXAMPLES

Example 1—in Accordance with the Invention

In this example, only the conditioning step a) and the depolymerization step b) are described, for a process for the depolymerization of a 100% PET feedstock continuously with a recycling capacity of 20 KTY (kilotonnes per year) of PET (i.e. 2500 kg/hour).

The conditioning and premixing step (a) is implemented in an extruder for melting the PET feedstock and a static mixer for premixing the molten PET feedstock with ethylene glycol (MEG), as illustrated in FIG. 1.

The reaction section is composed of two perfectly stirred reactors in cascade. The working volumes of the reactors are: R1:3.75 $m^3$, R2:22.4 $m^3$. The reactors are mechanically stirred. Reactor R1 is equipped with a stirring head of spiral ribbon type. This stirring head, which is well known to those skilled in the art, is particularly suitable for mixing at high viscosity.

The operating conditions in the extruder, the static mixer and the first reactor R1 are summarized in Table 1 below:

TABLE 1

| | T ° C.¤ | P (MPa)¤ | Residence time | Weight ratio MEG/PET¤ |
|---|---|---|---|---|
| Extruder | 250¤ | 0.1¤ | 20 minutes¤ | 0¤ |
| Static mixer | 250¤ | ≥1¤ | 2 secondes¤ | 0.23¤ |
| Reactor R1 | 250¤ | 1¤ | 20 minutes¤ | 0.23¤ |

The use of a premixing of the molten feedstock with ethylene glycol, in a weight ratio of 0.23, makes it possible to reduce the viscosity of the feedstock from a value of 530 Pa·s for the molten PET feedstock alone to a viscosity of the mixture of about 10 Pa·s, particularly at the inlet of the first reactor R1. The conditioning step a), in accordance with the process of the invention, thus makes it possible to significantly reduce the viscosity of the feedstock before entry into the first reactor R1.

In order to check the effect of such a viscosity on the quality of mixing of the first reactor, the stirring power required to meet the criterion t*>10 is calculated for reactor R1.

With a viscosity at the inlet of reactor R1 of the order of 10 Pa·s makes it possible to ensure the stirring criterion t*>10, for an absorbed stirring power of less than 1500 $W/m^3$ in reactor R1, whereas with a molten PET feedstock alone, a stirring power of less than 1500 $W/m^3$ is not ensured to meet the stirring criterion t*>10.

Thus, it is seen that premixing the feedstock with a solvent such as MEG upstream of the reaction section affords flexibility to a process for depolymerizing a PET feedstock and ensures mixing of good quality in the depolymerization reactors while at the same time complying with an entirely reasonable stirring power.

The invention claimed is:

1. A process for depolymerizing a polyester feedstock comprising PET, said process comprising:

a) a conditioning step implementing at least one conditioning section to produce a stream of conditioned feedstock, and a mixing section to produce a mixed stream, wherein the mixed stream has a viscosity of 10 Pa·s, wherein said conditioning section is fed at least with said polyester feedstock and is implemented in an extruder and at a temperature of 225 to 275° C., wherein said mixing section is at least fed with said stream of conditioned feedstock obtained from the conditioning section and a diol effluent comprising at least 95% by weight of ethylene glycol, and is operated in the extruder, at a temperature of 225 to 275° C., with a residence time of 0.5 second to 20 minutes, and wherein the weight ratio of diol relative to the polyester feedstock is 0.03 to 3.0;

b) a step of depolymerization by glycolysis, fed at least with the mixed stream and optionally with a diol supply, wherein the total amount of diol feeding said step b) is 1 to 20 mol of diol per mole of diester feeding said step b), performed at a temperature of 180 to 400° C., and a residence time of 0.1 to 10 hours;

c) a step of separating out the diol fed at least with the effluent from step b), performed at a temperature of 100 to 250° C., at a pressure below that of step b), and producing a diol effluent and an effluent rich in liquid monomers, wherein said diol separation step is performed in 1 to 5 successive gas-liquid separation sections, wherein each of the gas-liquid separation sections produces a liquid effluent and a gas effluent, wherein the liquid effluent from the preceding section feeding the next section, the liquid effluent obtained from the last gas-liquid separation section constituting the effluent rich in liquid monomers, the gas effluents all being recovered to constitute the diol effluent;

d) a step of separating the effluent rich in liquid monomers obtained from step c) into a heavy impurities effluent and a pre-purified monomers effluent, performed at a temperature of less than or equal to 250° C. and a pressure of less than or equal to 0.001 MPa with a liquid residence time of less than or equal to 10 minutes, wherein at least a fraction of the heavy impurities effluent is recycled directly into the reaction section of step b), and e) a step of decolourizing the pre-purified monomers effluent, performed at a temperature of 100 to 250° C., and at a pressure of 0.1 to 1.0 MPa in the presence of an adsorbent and producing a purified monomers effluent.

2. The process according to claim 1, in which said polyester feedstock comprises at least 15% by weight of opaque PET.

3. The process according to claim 1, in which said polyester feedstock comprises at least 10% by weight of opaque PET.

4. The process according to claim 1, in which said polyester feedstock comprises coloured PET.

5. The process according to claim 1, in which said polyester feedstock comprises 0.1% to 10% by weight of pigments.

6. The process according to claim 1, in which said polyester feedstock comprises between 0.1% and 5% by weight of pigments.

7. The process according to claim 1, in which the conditioning section of step a) is implemented at a temperature of 225 to 250° C.

8. The process according to claim 1, in which the conditioning section of step a) is implemented at a temperature of 250 to 275° C.

9. The process according to claim 1, in which the conditioning section of step a) is implemented at a temperature of 250° C.

10. The process according to claim 1, in which the mixing section is operated at a temperature of 250° C.

11. The process according to claim 1, in which the mixing section is implemented with a residence time of 3 seconds to 1 minute.

12. The process according to claim 1, in which the diol effluent introduced into the mixing section of step a) is superheated prior to being introduced into the mixing section of step a).

13. The process according to claim 1, wherein the weight ratio of the diol relative to the polyester feedstock is 0.05 to 2.0.

14. The process according to claim 1, wherein the weight ratio of the diol relative to the polyester feedstock is 0.1 to 1.0.

15. The process according to claim 1, wherein the weight ratio of the diol weight relative to the weight of the polyester feedstock is 0.35 to 1.0.

16. The process according to claim 1, wherein during depolymerization, which occurs in one or more depolymerization reactors, said one or more reactors are stirred with a stirring power of less than 3000 W/$m^3$.

17. The process according to claim 1, wherein during depolymerization, which occurs in one or more depolymerization reactors, said one or more reactors are stirred with a stirring power of 500 to 2000 W/$m^3$.

18. The process according to claim 1, in which the diol effluent introduced into the mixing section of step a) is a fraction of the diol effluent obtained from step c).

* * * * *